United States Patent Office 3,420,316
Patented Jan. 7, 1969

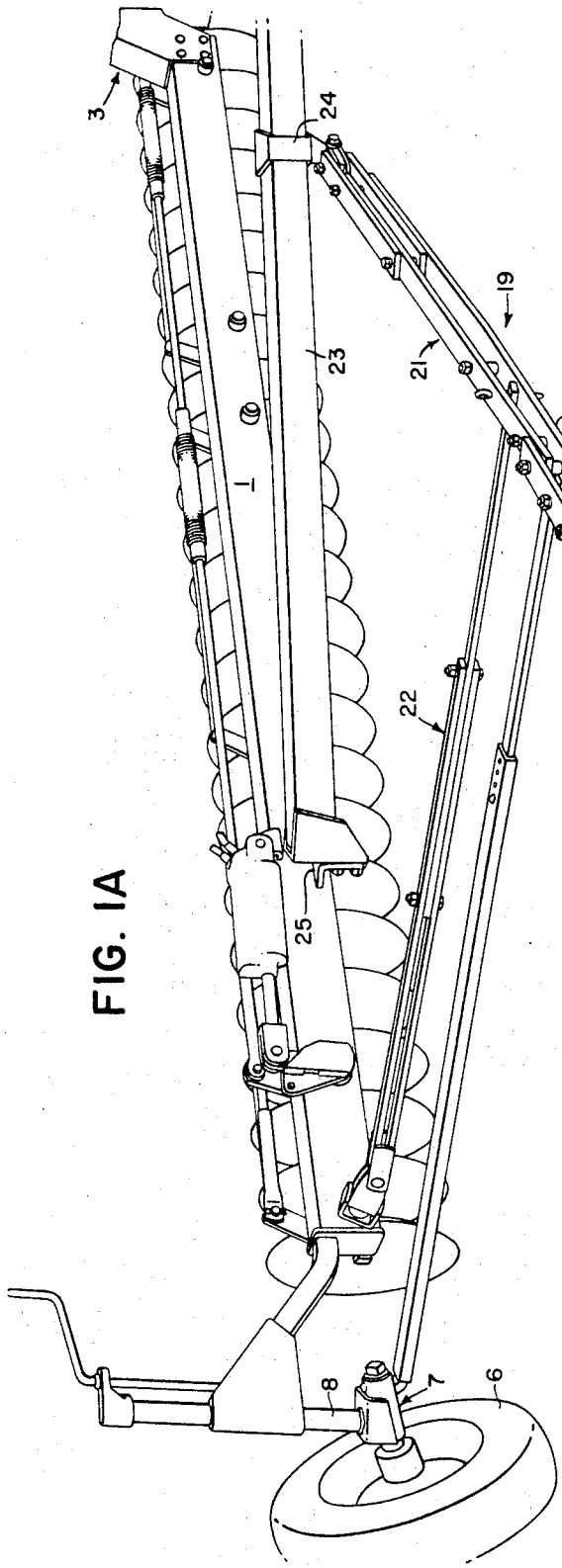
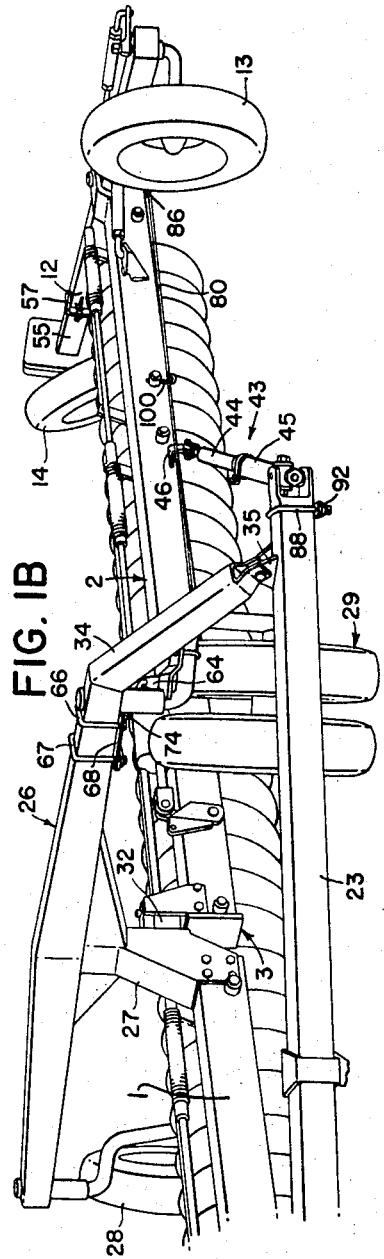
FIG. 1A
FIG. 1B
INVENTOR
KENNETH L. KIRKPATRICK
BY
ATTORNEY

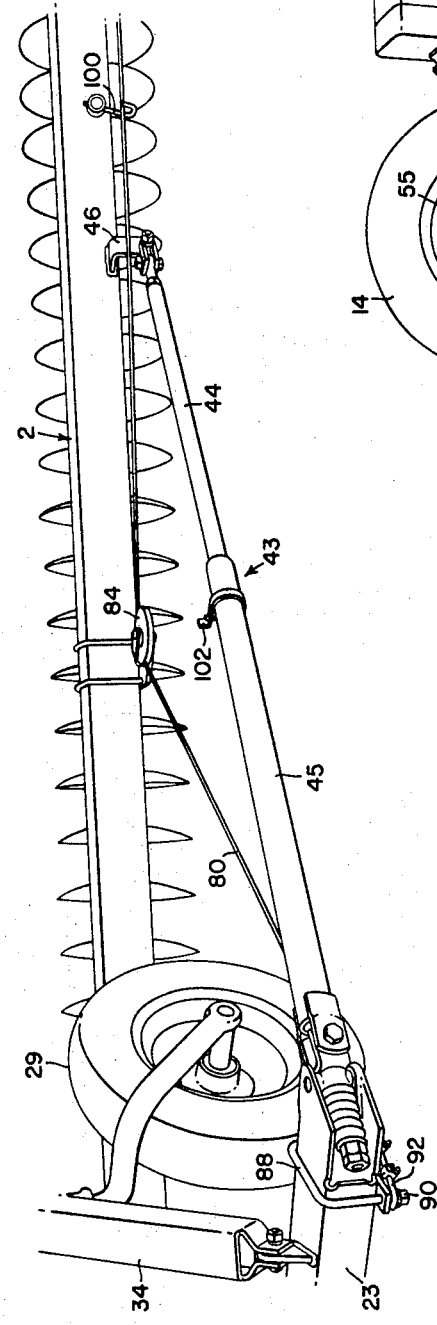
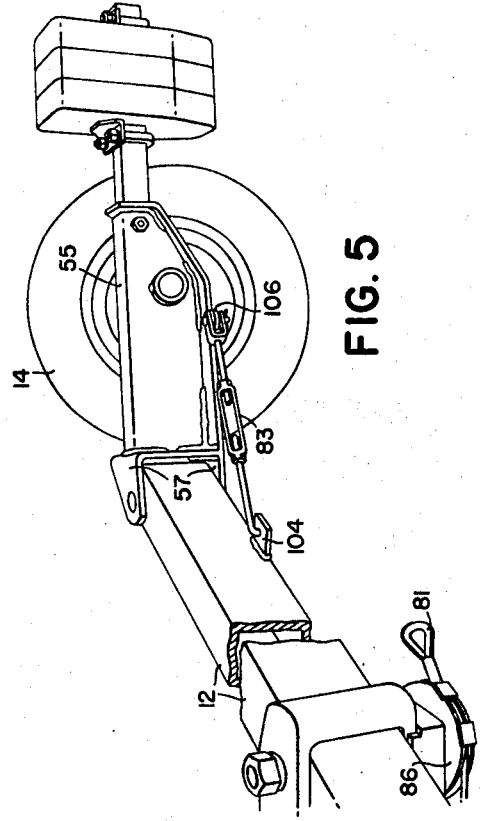
INVENTOR
KENNETH L. KIRKPATRICK
ATTORNEY

3,420,316
STEERING IMPROVEMENTS FOR DUPLEX DISK TILLER
Kenneth L. Kirkpatrick, Welland, Ontario, Canada, assignor to Deere & Company, Moline, Ill., a corporation of Delaware
Filed Oct. 7, 1965, Ser. No. 493,632
U.S. Cl. 172—288                           5 Claims
Int. Cl. A01b *65/04;* A01b *69/00*

ABSTRACT OF THE DISCLOSURE

A control device for the rear furrow wheel of a disk tiller having an articulated frame, the control means serving to lock the rear furrow wheel in a straight ahead position when the tiller is in its normal working position but permitting the rear furrow wheel to swing away from the frame when making a left turn. Control means are also provided for the front dual carriage wheel to permit the wheel to be led to the left while permitting further turning to the left as when making a left-hand turn.

---

This invention relates generally to agricultural implements and more particularly to duplex disk tillers.

It has been found with duplex disk tillers of the type shown in U.S. Patent 3,219,126 issued Nov. 25, 1965, to Lymburner et al. that while these tillers will perform satisfactorily in most ground conditions, that occasionally these tillers do not perform satisfactorily when the ground is soft. Apparently in this condition the rolling resistance to the supporting wheels is greater than the side thrust of the disks with the result that the tiller trails back at the rear end instead of swinging to the left as is normal with a one-way cutting disk tiller. In this form of disk tiller the rear furrow wheel is designed to absorb thrust in one direction only so when the opposite reaction is encountered, as in the condition mentioned above, this wheel pivots to the left in the same manner as it would when making a left-hand turn. The rear return spring shown in FIG. 4 of the aformentioned application was not intended to and will not control this side thrust movement.

Therefore, it is an object of this invention to overcome the aforementioned problem and to this end means have been developed to control the front wheel of the center dual carriage frame and to lock the rear wheel in position while the machine is working.

More specifically, it is an object of the present invention to provide in a disk tiller having articulated forward and rear frames, means to hold the rear furrow wheel from swinging movement when the frames are in their normal working position but which will permit the rear furrow wheel to swing or turn in a clockwise direction (when viewed from above) when a left-hand turn is initiated.

Another object of the present invention is to provide means to lead the front wheel of the center dual carriage frame.

A further object of the present invention is to provide a structure which will overcome the foregoing disadvantages of the prior art, the structure being low in cost and reliable in operation.

These and other objects and advantages of this invention will be apparent to those skilled in the art after a consideration of the following detailed description, taken in conjunction with the accompanying drawings in which the preferred form of this invention is illustrated.

FIGS. 1A and 1B are perspective views of the front and rear portions, respectively, of a relatively large hinged disk tiller incorporating the principles of this invention, FIGS. 1A and 1B showing the disk tiller in its normal operating position.

FIG. 3 is a perspective view showing a portion of the means for limiting the swinging of the rear furrow wheel when the implement is in its normal working position.

FIG. 5 is a perspective view of the rear furrow wheel taken from the other side, showing the position of the wheel when the device is in its highway transport position.

Figure 6:
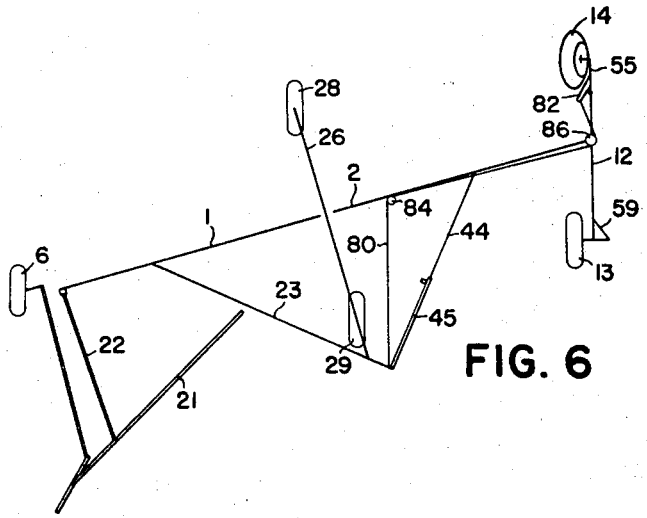
Figure 7:
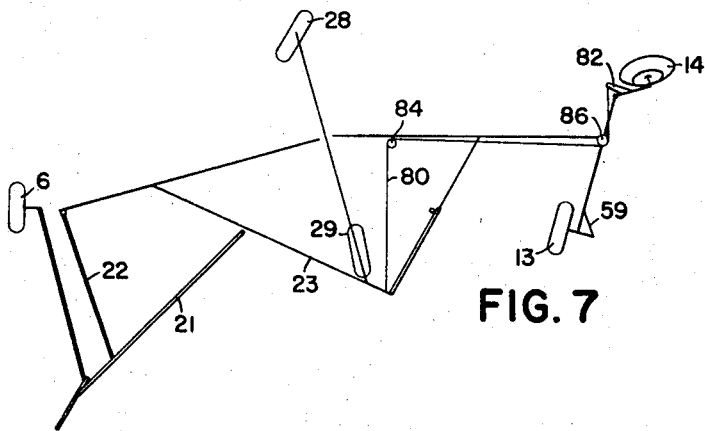
Figure 8:
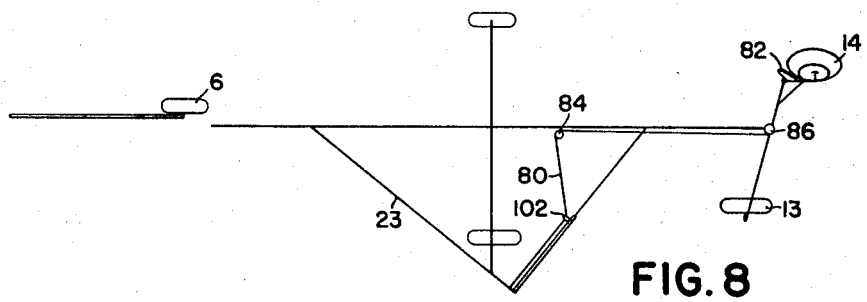

FIGS. 6, 7, and 8 are schematic plan views of the disk tiller of this invention, showing the tiller and the rear furrow wheel lock-up means in the normal working position in FIG. 6, in the left-hand turn position in FIG. 7, and in the highway-transport position in FIG. 8.

In the following description, right-hand and left-hand reference is determined by standing to the rear of the disk tiller and facing the direction of travel.

Referring first to FIGS. 1A and 1B, the disk tiller in which this invention has been incorporated includes tool frames 1 and 2 normally disposed in longitudinal alignment and hingedly interconnected at their adjacent ends by ball and socket means indicated generally at 3. The implement is normally operated with the frames 1 and 2 arranged in a diagonal position relative to the direction of forward travel as best shown in FIG. 6, each frame extending in the same direction. The front end of the front frame section 1 is supported on front wheel means which includes a front furrow wheel 6 journaled on axle means 7 carried at the lower end of vertical spindle 8. The rear end of the rear frame section 2 is carried on a fore-and-aft extending frame bar 12 supported at its front end on a land wheel 13 and at its rear end on a rear furrow wheel 14.

The implement is propelled by means of a tractor, represented by the drawbar 18, which is connected to the disk tiller frame by a draft frame 19. The draft or hitch frame 19 comprises a pair of adjustable bars 21 and 22 connected in any suitable way at the rear end with the front end of the front frame section 1 and with a transversely extending hitch beam 23, the connection with the latter member being adjustable, as by means of a slidable clamp 24. The right end of the hitch beam 23 is connected in any suitable way, as by bracket 25, with the front frame section 1, and the left end of the hitch frame beam 23 is supported on the front end of a dual carriage wheel frame 26 that is connected at its midpoint with a supporting bracket 27 carried at the rear or left end of the frame 1. The rear or right end of the dual carriage wheel frame 26 is carried on a castering wheel 28 and the front end of the carriage is supported on a dual wheel 29.

The frame structure 26 includes a forwardly and downwardly extending section 34 that is pinned to a bracket 35 carried by a left portion of the hitch beam 23. The left end of the hitch beam 23 is connected with the frame 2 by means of a telescopically arranged link 43 that is made up of an inner section 44 and an outer section 45. The rear end of the inner section 44 is connected by means of a bracket 46 with the rear frame section 2, and the forward end of the forward section 45 carries a pair of apertured lugs through which a pivot bolt carried by the left-hand end of the hitch beam 23 projects.

Figure 4:
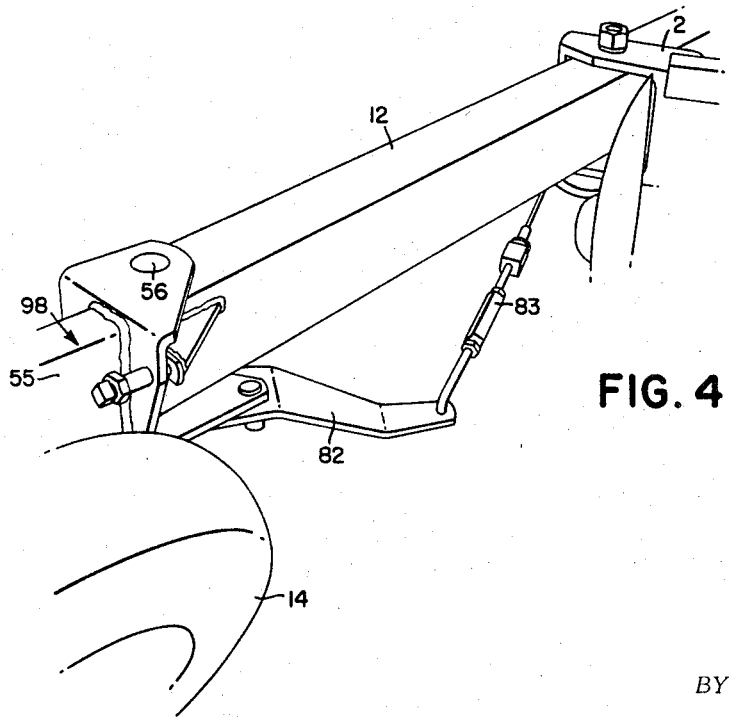
FIG. 4 is a perspective view of the rear furrow wheel in its working position.

The rear furrow wheel 14 is connected to the fore-and-aft extending frame member 12 by means of a rearwardly extending laterally swingable arm 55 (FIGS. 4 and 5) connected at its forward end by a vertical pivot 56 that is received in the upper and lower portions of a yoke 57 fixed to and forming the forward end of the arm 55. The position of the rear land wheel 13 can be adjustably positioned by means of a turnbuckle 59.

The foregoing structure is more fully described in the patent mentioned above.

Figure 2:
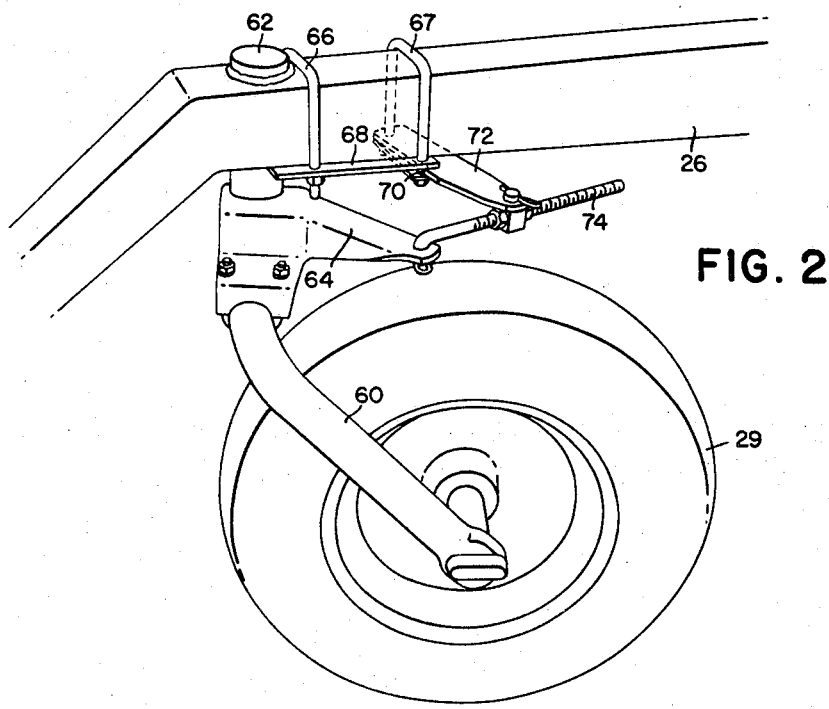
FIG. 2 is a perspective view showing the front wheel of the center dual carriage frame in its working position.

To overcome the problem of the tiller trailing back in soft ground conditions, it has been necessary to provide a front dual carriage wheel control device which is best illustrated in FIG. 2. This control device permits the dual wheel 29 to be lead to the left while permitting further turning to the left as when making a left-hand turn. To this end the dual wheel 29 is supported on the frame 26 by means of an axle arm 60 which carries at its upper end a spindle 62 which is journaled within the frame 26. To control the swinging of the wheel, the axle arm carries an arm 64 which projects toward the sections 1, 2. This steering arm is attached to the wheel frame 26 by means of linkage which permits swinging in one direction but not the other. This linkage includes two U-bolts 66, 67 which carry at their lower ends a plate member 68. The U-bolt 67 projects below the plate 68 and carries a stop 70 on the left rear leg, the right leg pivotally carrying a pivot bracket 72. The rear end of the pivot bracket 72 carries a caster rod 74 whose forward end is secured to the steering arm 64, the rear end of the caster rod being adjustably secured to the rear end of the pivot bracket 72. In normal field-working position, as shown in FIG. 6, the dual wheel 29 is positoned in a straight ahead position. However, if the ground is soft, by adjusting the nuts on the threaded rod 74, it is possible to lead this wheel toward the left which, as a result, will assist in preventing the tiller from trailing back. Breakaway of the swinging arm from its stop 70 allows free left-hand turns as can be seen from FIG. 7. When the tiller is to be transported on a highway in the manner shown in FIG. 8, the caster rod is disconnected entirely from the steering bracket 64, permitting the wheel 29 to caster freely.

To prevent the rear furrow wheel from swinging away from the frame when working in soft ground conditions, a rear furrow wheel locking means is provided which includes a cable 80 which is secured at its forward end to the hitch beam 23 adjacent the telescoping sections 44, 45. The rear end of the cable 80 is formed into a loop 81 which is secured to an outwardly projecting arm 82 carried by the swingable arm 55 by means of a turnbuckle 83 whose rear end is positioned within an aperture in the arm 82. Intermediate portions of the cable are supported by a forward sheave 84 carried by the forward portion of the frame 2 and a rear sheave 86 carried by the rear end of the frame 2 adjacent the fore-and-aft extending member 12. The forward end of the cable 80 is secured to the left-hand end of the hitch beam 23 by means of a U-bolt 88, the lower end of the forward leg carrying a cable thimble 90 for reception of the forward loop end 92 of the cable 80.

The wheel 14 is positioned by means of an adjustable stop indicated generally at 98 for normal operation in which the device is positioned in the manner indicated in FIG. 6. The wire rope 80 is tensioned with the turnbuckle 83 to utilize as much force as is required to hold this wheel 14 when working. It should be noted at this point that any loads assumed in the wire rope will absorb some of the loading from the telescoping hitch members 44, 45. When making a left-hand turn, the wheel 14 is released for turning by using the angular motion available between the front and rear frames. The telescoping hitch member, which connects the rear end of the rear frame to the front frame hitch beam, is in a fully extended position (FIG. 6) while the machine is in normal working position. When a left-hand turn is made, this telescoping member shortens in length as can be seen from FIG. 7 and permits the front and rear frames to assume an angular relationship to each other. When the frames 1 and 2 are angularly related, the distance between the U bolt 88 and the forward sheave 84 is lessened, causing slack in the cable 80 which may be taken up by a right-hand or clockwise swinging movement of the arm 55 which carries the wheel 14, thus permitting the arm to swing away from the adjustable stop 98. To prevent the cable from catching in any trash that may be present when making a left-hand turn, intermediate cable supports 100 may be provided as needed.

To transport the device over a highway, the rear loop 81 of the cable 80 is disconnected from the turnbuckle 83 and the cable is positioned in the manner shown in FIG. 8 wherein an intermediate portion of the cable between the sheave 84 and U bolt 88 is supported on a support 102 mounted on the telescoping hitch member 45. In this position the rear end of the cable will be drawn up to the sheave 86 so that the cable will not drag upon the ground. The rear wheel 14 is positioned for transport by interconnecting a bracket 104 formed on the rear end of the left-hand side of the fore-and-aft extending member 12 and a bracket 106 formed on the left-hand side of the member 55 by means of the turnbuckle 96.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. In a disk tiller having a forward main frame and a rear auxiliary frame articulately connected to the main frame and adapted to be in alignment in a generally diagonal direction, forward wheel means supporting the front end of the main frame, a normally fore-and-aft extending frame bar secured to the rear of the auxiliary frame and carrying a rear furrow wheel swingably connected to said frame bar, said wheel being swingable from a position in substantial alignment with said frame bar to a position out of alignment in a generally horizontal plane, means to positively hold said wheel in substantial alignment when said frames are in alignment, said last-mentioned means permitting said wheel to swing out of alignment when the frames move out of alignment, an intermediate wheel means supporting the rear end of the main frame and the front end of the auxiliary frame, said intermediate support means comprising a frame member secured to one of the main and auxiliary frames and extending to either side, said frame member carrying adjacent each end wheel means, one of said last-mentioned wheel means being interconnected with said frame means by adjustable steering means whereby a predetermined lead may be given to said one wheel means.

2. In a disk tiller having a forward main frame and a rear auxiliary frame articulately connected to the main frame and adapted to be in alignment in a generally diagonal direction, forward wheel means supporting the front end of the main frame, rear wheel means supporting the rear end of the auxiliary frame, and intermediate wheel means supporting the rear end of the main frame and the front end of the auxiliary frame, said intermediate support means comprising a frame member secured to one of the main and auxiliary frames and extending to either side, said frame member carrying adjacent each end, wheel means, one of said last mentioned wheel means being interconnected with said frame means by adjustable steering means whereby a predetermined lead may be given to said one wheel means.

3. A control device for the rear furrow wheel of a disk tiller having a rear frame and a forward frame articulately secured to the rear frame and extending in the same direction as the rear frame when the frames are in their normal working position, the forward frame being disposed at an angle to the rear frame when making a left-hand turn, the rear furrow wheel being interconnected with the rear frame for swinging movement between only a normal working position in which the wheel is disposed in a generally fore-and-aft position and a position in which the rear furrow wheel is swung away from the frame in a clockwise direction, said control means comprising: means extending between the front frame and the rear furrow wheel operative to hold the rear furrow wheel in its normal working position when the frames are in their normal working position while permitting independent swinging movement of the rear furrow wheel away from the rear frame when making a left-hand turn.

4. The control device set forth in claim 3 in which said control means includes hitch means connected with the forward frame, connecting means interconnecting said hitch means with the rear frame to permit limited movement of the hitch towards and away from the rear frame as the front frame swings toward the rear frame, as when making a left turn, and as the front frame swings away from the rear frame to a position where the frames extend in the same direction, and means responsive to the movement of the hitch means towards and away from the rear frame to positively hold said rear furrow wheel in its fore-and-aft position when said frames extend in the same direction and to permit said wheel to swing away from the rear frame when the forward frame moves toward the rear frame.

5. The control set forth in claim 4 in which said means responsive includes a cable connected at one end with the rear furrow wheel means and at the other end with one of said hitch means and connecting means, intermediate portions of said cable being carried by sheaves which are in turn carried by said rear frame.

References Cited

UNITED STATES PATENTS 2,601,526  6/1952  Howard _____ 280—103
3,066,746  5/1961  Sweet _____ 172—284

ABRAHAM G. STONE, *Primary Examiner.*

J. R. OAKS, *Assistant Examiner.*